United States Patent [19]

Stieger

[11] Patent Number: 4,856,632
[45] Date of Patent: Aug. 15, 1989

[54] SAFETY CLUTCH FOR ROTATING DRIVES

[75] Inventor: Othmar Stieger, Kindhausen, Switzerland

[73] Assignee: Elpatronic AG, Zug, Switzerland

[21] Appl. No.: 163,648

[22] Filed: Mar. 3, 1988

[30] Foreign Application Priority Data

Apr. 2, 1987 [CH] Switzerland ............. 01271/87

[51] Int. Cl.⁴ ............. F16D 46/20; F16D 23/00
[52] U.S. Cl. ............. 192/56 F; 192/85 A; 192/150; 464/30
[58] Field of Search ............. 192/56 F, 85 A, 88 A, 192/150; 464/30

[56] References Cited

U.S. PATENT DOCUMENTS

| 3,288,258 | 11/1966 | Taylor | 192/150 |
| 3,442,362 | 5/1969 | Bangerter | 192/56 F |
| 3,960,035 | 6/1976 | Workman, Jr. et al. | 192/56 F |
| 4,478,320 | 10/1984 | Baba | 192/150 |

OTHER PUBLICATIONS

Brochure No. 8312 I.A. of Messrs. Fertigung, Stechnik, Walter, Hafner, D-8751 Kleinwallstadt, p. 14, Series FHW/BA.
Brochure of Messrs. Binder & Geisser AG, CH-8029, Zürich, Series SIK-ZF.
Brochure of the Maschinenfabrik Mönninghoff GmbH & Co. KG, D-4630, Bochum.

Primary Examiner—Leslie A. Braun
Assistant Examiner—Andrea Pitts
Attorney, Agent, or Firm—McCormick, Paulding & Huber

[57] ABSTRACT

Locking arrangements (40,44) are respectively connected, for joint rotation, to a driving and a driven hub (10,16) which are mounted for rotation in relation to one another. The two locking arrangements (40,44) can be coupled to one another by at least one detent member (42) which, in an engaged position, produces an axial disengaging force (B) depending on the transmitted torque. A loading device is provided to produce an engaging force (C) which can be overcome by the disengaging force (B) if a certain torque is exceeded. This stressing device comprises a cylinder compartment (36) to which a fluid under pressure can be supplied from an inlet (56) so long as the detent member (42) is engaged. The detent member (42) is connected to a distributing slide valve (32) for joint axial displacement, which distributing slide valve separates the cylinder compartment (36) from the inlet (56) and connects it to a relief passage (76) if the detent member (42) is at least partially disengaged.

10 Claims, 3 Drawing Sheets

SAFETY CLUTCH FOR ROTATING DRIVES

BACKGROUND OF THE INVENTION

The invention relates to a safety clutch for rotating drives having
a driving and a driven hub which are mounted for rotation in relation to one another,
two locking arrangements each of which is connected to one of the hubs for joint rotation,
at least one detent member which, in an engaged position, couples the two locking arrangements to one another and produces an axial disengaging force depending on the transmitted torque, and
a loading device to produce an engaging force which can be overcome by the disengaging force if a specific torque is exceeded.

In a known safety clutch of this type (Brochure No. 8312 I.A of Messrs. Fertigungstechnik Walter Hafner, D-8751 Kleinwallstadt, page 14, series FHW/BA), the two hubs have annular end faces which lie in a common plane and comprise detents which extend radially with respect to the axis of rotation of the clutch. Cylindrical rolling bodies are provided as detent members, which rolling bodies are likewise arranged radially and are loaded axially by a loading device in the direction of the detents.

The loading device includes a ring on which the detent members can roll and which is prestressed by a cup spring. The prestressing can be adjusted by a nut which is screwed onto one of the two hubs and against which the cup spring is supported. The same hub has to be secured directly to a driving shaft while the other hub is secured to a driven shaft selectively directly or through a resilient corrugated tube.

In another safety clutch of the said type which is likewise known (Brochure of Messrs. Binder & Geisser AG, CH-8029 Zürich, series SIK-ZF), balls are provided as detent members instead of cylindrical rollers.

In further known safety clutches of the said type (Brochure of the Maschinenfabrik Monninghoff GmbH & Co. KG, D-4630 Bochum) the locking arrangements are crown gears which are also known by the name of Hirth toothing; here the teeth of each of the two sets of crown toothing represent detent members which engage in the gaps between the teeth in the other set of toothing. An electromagnet with associated armature is provided as a loading device which tends to hold the two sets of crown teeth together.

It is common to all these known safety clutches that the detent members slip over the locking arrangement or arrangements in which they normally engage, if a certain torque is exceeded. The magnitude of this torque depends on the formation of the locking arrangements, for example on the tooth flank angle if the locking arrangements are crown teeth, and further depends on the axial engaging force which is produced by the loading device.

When the detent members slip over the locking arrangement or arrangements, a torque, which is not negligible, is still transmitted; in addition, the detent members and locking arrangements wear away to a considerable degree if the slipping continues for a long time. This can possibly be counteracted in electromagnetic clutches as a result of the fact that their supply of current is cut off if the detent members leave their normal position. Because of the inevitably large inert masses of their windings and armatures, electromagnetic clutches are not, however, suitable for applications in which it is important to keep the rotating inert masses small.

It is therefore the object of the invention to develop further a safety clutch for rotating drives in such a manner that when a certain torque, which is still regarded as permissible, is exceeded, it still transmits only a very slight residual torque in comparison with this torque and wherein the inert masses rotating with each of the two hubs are small in comparison with electromagnetic clutches of the same capacity.

According to the invention, the problem is solved in that
the loading device comprises a cylinder compartment to which a fluid under pressure can be supplied from an inlet so long as the detent member is engaged, and
the detent member is connected to a distributing slide valve for joint axial displacement, which slide valve separates the cylinder compartment from the inlet and connects it to a relief passage if the detent member is at least partially disengaged.

Compressed air may be used as fluid for producing the engaging force, which has the advantage that the filling of the cylinder compartment has a negligibly small inert mass; in addition, the compressibility of the air facilitates the initial movement of the distributing slide valve, which is necessary during the disengagement.

SUMMARY OF THE INVENTION

It is a particular advantage if the clutch according to the invention comprises a resilient corrugated tube which bounds the cylinder compartment radially to the outside and connects the distributing slide valve to a clutch part which is stationary in the axial direction. Such a corrugated tube itself has a small inert mass in comparison with the size of the cylinder compartment enclosed by it and can be reliably secured, in a sealed manner, on the one hand to the distributing slide valve and on the other hand to the clutch part which is stationary in the axial direction, in a simple manner, for example by welding or by low-mass components, for example ordinary commercial clamping rings.

The corrugated tube is preferably of such a nature that it can be loaded with all the torque to be transmitted by the safety clutch. It is therefore particularly advantageous if the corrugated tube consists of spring steel or another material capable of carrying a high stress (stainless steel).

In addition, it is an advantage if the corrugated tube is secured by one end, via a flange of the stationary clutch part, to one of the two hubs and by the opposite end to a flange of the distributing slide valve.

It is further advisable for the detent member or—if there are a plurality of detent members—all the detent members, to be made integral with one of the two locking arrangements. It is also possible, however, as in two of the safety clutches described at the beginning, for there to be a physical separation between the detent member or the detent members on the one hand and each of the two locking arrangements on the other hand.

The detent member—or all the detent members—is preferably continuously loaded by a spring in the disengagement sense and is kept completely disengaged by this spring, if there is no pressure in the cylinder compartment.

The spring may be formed by the resilient corrugated tube and/or a separate spring.

It is further appropriate if the cylinder compartment can be connected to the inlet through a by-pass which is controlled by an auxiliary control member.

This embodiment can be further developed in that the distributing slide valve is a tubular piston which is guided on an axial extension of one of the two hubs and the auxiliary control member is likewise guided for axial displacement in a central axial bore in the extension.

Finally, it is an advantage if the auxiliary control member comprises a push-button which projects axially out of a free end face of the extension.

BRIEF DESCRIPTION OF THE DRAWINGS

One example of embodiment of the invention is explained below, with further details, with reference to diagrammatic drawings. The drawings show, each in an oblique view and partially in axial section, a safety clutch in three different positions, namely, FIG. 1, in the engaged position FIG. 2, in the disengaged position and FIG. 3, in the disengaged position but ready for engagement.

DESCRIPTION OF THE PREFERRED EMBODIMENTS

Figure 1:
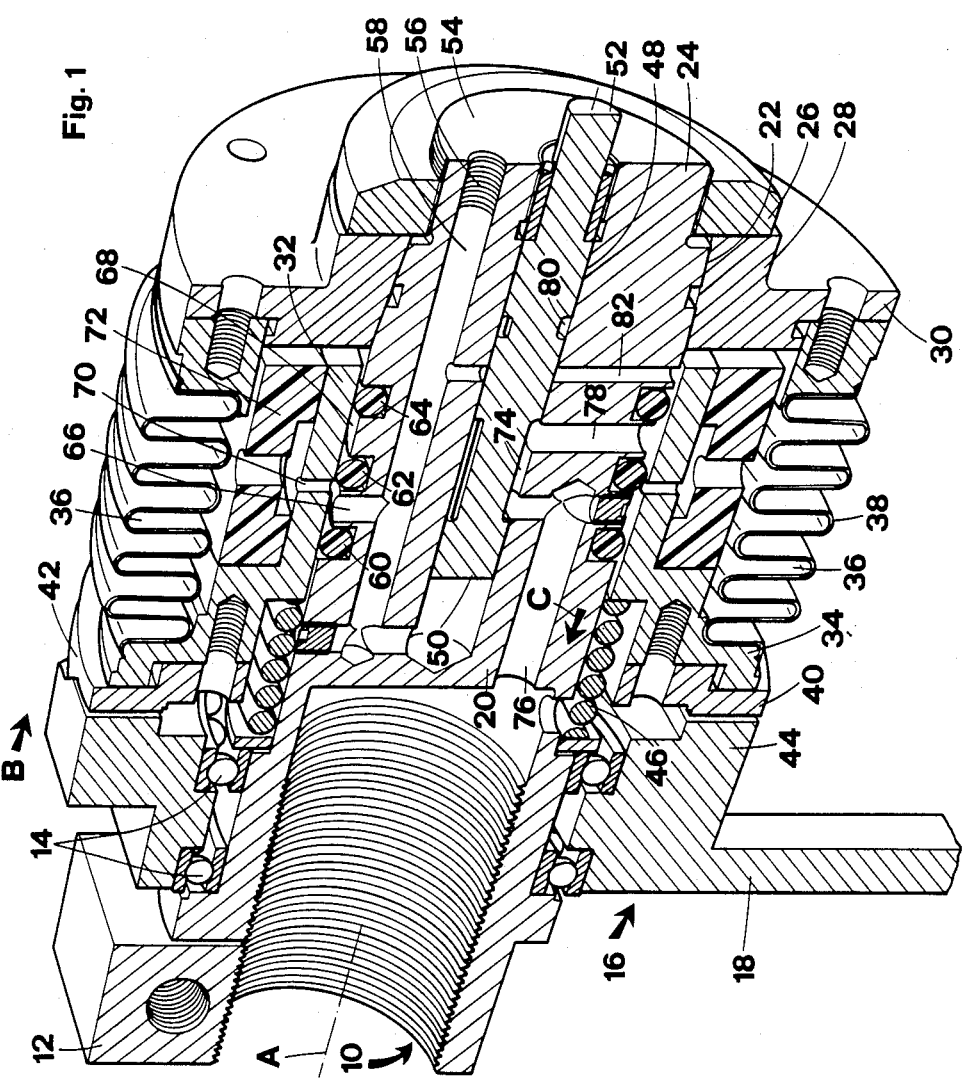

The safety clutch illustrated has a driving hub 10 which is partially drilled hollow along its axis A and can be secured, by means of a clamping device 12, to an output shaft of a pendulum drive of known construction, not illustrated, and can be driven by this in a reciprocating pendulum motion through a certain angle. A driven hub 16 is mounted for rotation on the driving hub 10 by means of two rolling bearings 14 which are deep-groove ball bearings in the example illustrated.

A lever 18, which may, for example, drive an intermittently operating conveying device of known construction, projects radially away from the driven hub 16.

The driving hub 10 has an axial extension 20 which has a tapered region 22 near its end and ends in a threaded neck 24. Secured to the tapered region 22 by means of a nut 26 screwed onto the threaded neck 24 is a disc-shaped clutch member 28 which has a flange 30 projecting radially outwards. The flange 30 bounds a cylindrical portion of the extension 20 on which a piston-like, tubular distributing slide valve 32 is axially displaceable.

The distributing slide valve 32 has a flange 34 at its end remote from the flange 30. The two flanges 30 and 34 define a cylinder compartment 36 which is enclosed radially towards the outside by a resilient corrugated tube 38 which is secured in a sealed manner to these two flanges. The corrugated tube 38 is resiliently compressible and extensible in the axial direction but is resistant to torsion so that the flanges 30 and 34 cannot turn about the axis A in relation to one another.

In the example illustrated, the corrugated tube 38 consists of spring steel or another metal which can be highly stressed, such as for example, stainless steel, and forms the only torque-transmitting connection between the flanges 30 and 34 to each of which it is secured by one end, preferably being welded on. Accordingly, the entire torque with which the safety clutch is loaded is transmitted via the corrugated tube 38.

Secured to the flange 34 of the distributing slide valve 32 is a locking arrangement 40; formed on this, at the end face, are detent members 42 which are separated from one another by a diametral groove. Situated axially opposite this locking arrangement 40, which is associated with the driving hub 10, is a complementary locking arrangement 44 which is formed on the driven hub 16.

Figure 2:
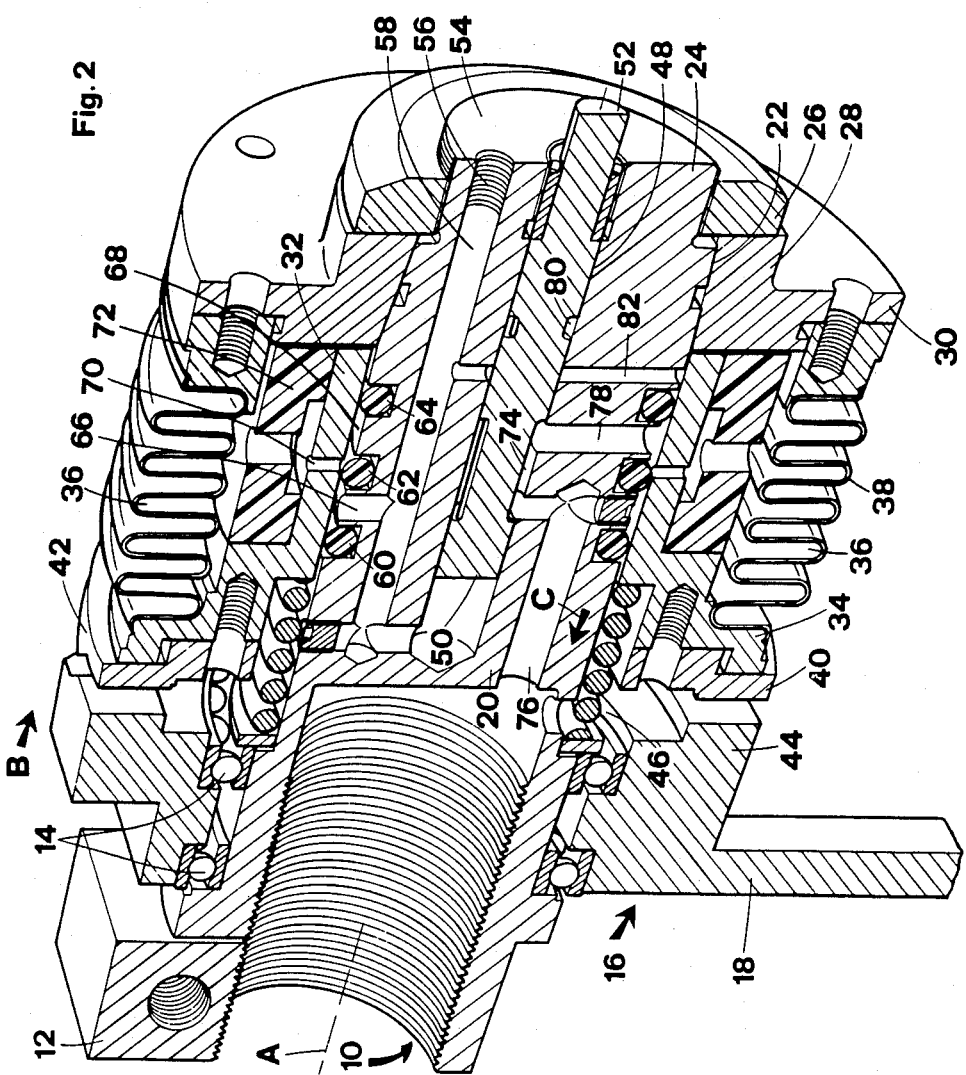
Figure 3:
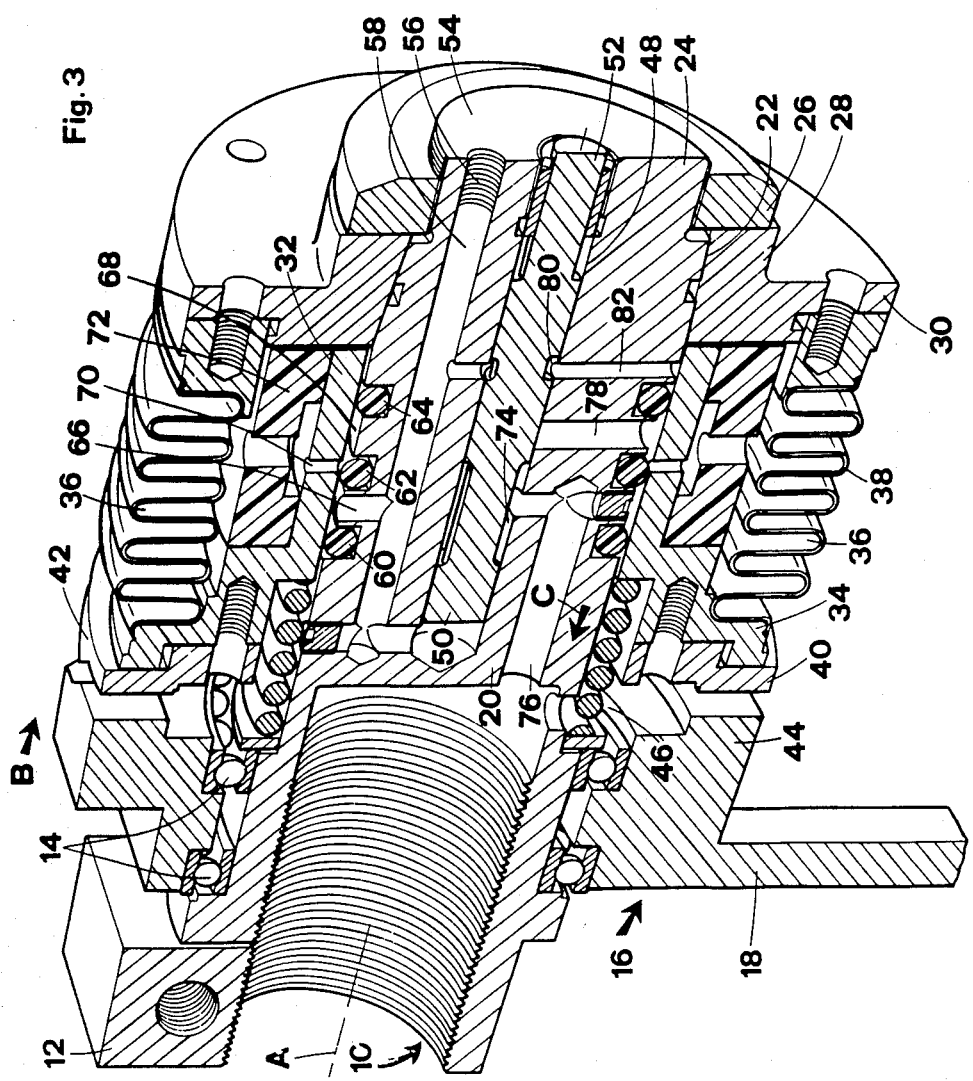

The distributing slide valve 32 is continuously loaded by a spring 46—a helical spring surrounding the extension 20 is illustrated—in such a manner that it tends to leave its position illustrated in FIG. 1 and to bear against the clutch member 28, which is stationary in the axial direction, as illustrated in FIGS. 2 and 3. Acting in the same direction is a disengaging force B which develops at adjoining oblique flanks of the detent members 42 on the one hand and of the locking arrangement 44 on the other hand, if the clutch is transmitting a torque; with a straight shape of the flanks, the disengaging force B is proportional to the torque. More detailed explanations of this appear unnecessary in view of the above-mentioned prior art.

The extension 20 has a central axial bore 48 which has a closed inner end and receives a piston-like auxiliary control member 50. One end of the auxiliary control member 50 is constructed in the form of a push-button 52 which projects to a greater or lesser extent beyond the plane end face 54 of the extension 20 according to the position of the auxiliary control member. Formed at the same end face 54, offset radially from the bore 48, is an inlet 56 to which a flexible compressed-air line or pressure-fluid line can be connected. From the inlet 56, a passage 58 with a parallel axis extends approximately as far inwards as the central bore 48.

The extension 20 carries, in a central region, three annular seals 60, 62, 64 which are disposed spaced axially apart from one another. Between the axially inner seal 60 and the middle seal 62, an annular space 66 is formed while a further annular space 68 is formed between the middle seal 62 and the axially outer seal 64. The annular space 66 is constantly connected to the passage 58 parallel to the axis and, with the clutch engaged as shown in FIG. 1, is connected also to the cylinder compartment 36 through control ports 70 in the distributing slide valve 32.

The cylinder compartment 36 contains a perforated filling member 72 of particularly light material, preferably foamed plastics material, the purpose of which is to reduce the volume of the cylinder compartment 36 which can be filled with a fluid.

The auxiliary control member 50 has a broad annular groove 74 which is connected to a relief passage 76 in the extension 20 so long as the auxiliary control member 50 assumes its position of rest illustrated in FIGS. 1 and 2, with the clutch engaged or disengaged. The relief passage 76 opens out into the free environment if the clutch is actuated pneumatically; if a hydraulic actuation should be provided, the relief passage 76 would have to be connected to a collecting vessel. With the clutch engaged as shown in FIG. 1 and with the clutch disengaged as shown in FIG. 2, the broad annular groove 74 is further connected, through a radial bore 78 in the extension 20, to the annular space 68 between the seals 62 and 64.

Furthermore, axially outside the broad annular groove 74, the auxiliary control member 50 has a narrow annular groove 80 which, with the clutch ready for engagement as shown in FIG. 3, connects the passage 58, parallel to the axis, to the cylinder compartment 36 through a radial bore 82 in the extension 20.

Starting from the engaged position shown in FIG. 1, loading of the clutch with a torque has the effect that a disengaging force B develops at the oblique flanks of the locking arrangement 40 cooperating with one another, together with their detent members 42 on the one hand and the locking arrangement 44 on the other hand, which force, jointly with the force of the spring 46, is greater than the pneumatic or hydraulic engaging force C effective at the distributing slide valve 32. Consequently, the distributing slide valve 32 approaches the clutch member 28. In the course of this, the control ports 70 travel over the middle seal 62 so that the cylinder compartment 36 is separated from the passage 58 parallel to the axis and is connected to the relief passage 76 through the annular space 68 and the broad annular groove 74.

Consequently, the cylinder compartment 36 rapidly becomes depressurised so that the distributing slide valve 32 is pushed towards the clutch member 28 by the spring 46 as shown in FIG. 2. The clutch is now completely disengaged. In the course of this, the auxiliary control member 50 has not changed its position since the inner end of the central bore 48 is still connected to the inlet 56 through the passage 58 parallel to the axis and is thus under pressure which holds the auxiliary control member 50 in its position of rest, an axially outer abutting position.

If the clutch is to be re-engaged, the push-button 52 is pushed inwards by a force applied from the outside, for example with a finger, so that the auxiliary control member 50 comes into its position illustrated in FIG. 3. In this position, the auxiliary control member 50 interrupts the connection between the radial bore 78 and the relief passage 76. At the same time, through its narrow annular groove 80, the auxiliary control member connects the passage 58 parallel to the axis with the radial bore 82, so that a by-pass results through which fluid under pressure flows from the inlet 56 into the cylinder compartment 36. Consequently, the engaging force C again develops and pushes the distributing slide valve 32 away from the flange 30 so that the locking arrangement 40 together with its detent members 42 again engages in the locking arrangement 44 as a result of which the hubs 10 and 16 are once more coupled to one another.

I claim:

1. A safety clutch for rotating drives having
    a driving and a driven hub (10,16), which are mounted for rotation in relation to one another,
    two locking arrangements (40,44), each of which is connected to one of the hubs (10,16) for joint rotation,
    at least one detent member (42) which, in an engaged position, couples the two locking arrangements (40,44) to one another and produces an axial disengaging force (B) depending on the transmitted torque, and
    a loading device to produce an engaging force (C) which can be overcome by the disengaging force (B) if a certain torque is exceeded, characterised in that
    the loading device comprises a cylinder compartment (36) to which a fluid under pressure can be supplied from an inlet (56) so long as the detent member (42) is engaged, and
    the detent member (42) is connected to a distributing slide valve (32) for joint axial displacement, which distributing slide valve disconnects the cylinder compartment (36) from the inlet (56) and connects it to a relief passage (76) if the detent member (42) is at least partially disengaged.

2. A safety clutch according to claim 1, having a resilient corrugated tube (38) which connects parts of the clutch to one another in such a manner that they are axially movable in relation to one another, characterized in that the corrugated tube (38) bounds the cylinder compartment (36) radially towards the outside and connects the distributing slide valve (32) to a clutch member (28) which is stationary in the axial direction.

3. A safety clutch according to claim 2, characterized in that the corrugated tube (38) can be loaded with all the torque to be transmitted by the safety clutch.

4. A safety clutch according to claim 2, characterized in that the corrugated tube (38) consists of spring steel or another metal which can be highly stressed.

5. A safety clutch according to claim 2, characterized in that the corrugated tube (38) is secured by one end to one of the two hubs (10) through a flange (30) of the stationary clutch member (28) and by its opposite end to a flange (34) of the distributing slide valve (32).

6. A safety clutch according to claim 1, characterized in that the detent member (42) is made integral with one of the two locking arrangements (40).

7. A safety clutch according to claim 1, characterized in that the detent member (42) is continuously loaded by a spring (46) in the disengagement sense and is held completely disengaged by this spring (46) if the cylinder compartment (36) is without pressure.

8. A safety clutch according to claim 1, characterized in that the cylinder compartment (36) can be connected to the inlet (56) through a by-pass (80,82) which is controlled by an auxiliary control member (50).

9. A safety clutch according to claim 8, characterized in that the distributing slide valve (32) is a tubular piston which is guided on an axial extension (20) of one of the two hubs (10) and in that the auxiliary control member (50) is likewise guided for axial displacement in a central axial bore (48) in the extension (20).

10. A safety clutch according to claim 9, characterized in that the auxiliary control member (50) comprises a push-button (52) which projects axially out of a free end face (54) of the extension (20).

* * * * *